(12) United States Patent
Horii

(10) Patent No.: US 8,278,896 B2
(45) Date of Patent: Oct. 2, 2012

(54) SWITCHING POWER SUPPLY DEVICE

(75) Inventor: Kazuhiro Horii, Toyama (JP)

(73) Assignee: Cosel Co., Ltd., Toyama-Shi (JP)

( * ) Notice: Subject to any disclaimer, the term of this patent is extended or adjusted under 35 U.S.C. 154(b) by 123 days.

(21) Appl. No.: 12/933,791

(22) PCT Filed: May 1, 2009

(86) PCT No.: PCT/JP2009/058564
§ 371 (c)(1),
(2), (4) Date: Sep. 21, 2010

(87) PCT Pub. No.: WO2009/136602
PCT Pub. Date: Nov. 12, 2009

(65) Prior Publication Data
US 2011/0018512 A1    Jan. 27, 2011

(30) Foreign Application Priority Data
May 7, 2008    (JP) .................................. 2008-121286

(51) Int. Cl.
G05F 1/00    (2006.01)
(52) U.S. Cl. ..... 323/282; 323/271; 323/283; 363/21.06; 363/21.14
(58) Field of Classification Search .................. 323/222, 323/231, 271, 272, 282, 283, 284
See application file for complete search history.

(56) References Cited

U.S. PATENT DOCUMENTS

| | | | | |
|---|---|---|---|---|
| 5,313,382 A | * | 5/1994 | Farrington | ....................... 363/16 |
| 5,770,940 A | * | 6/1998 | Goder | ........................... 323/282 |
| 6,462,962 B1 | | 10/2002 | Cuk | |
| 7,141,958 B2 | * | 11/2006 | Saitoh | ........................... 323/299 |
| 7,782,027 B2 | * | 8/2010 | Williams | ....................... 323/266 |

FOREIGN PATENT DOCUMENTS

| | | |
|---|---|---|
| JP | 2005-27394 A | 1/2005 |
| JP | 2005-137198 A | 5/2005 |
| JP | 2006-311741 A | 11/2006 |
| JP | 2007-244156 A | 9/2007 |

OTHER PUBLICATIONS

International Search Report dated Aug. 11, 2009 issued in International Appln. No. PCT/JP2009/058564.
International Preliminary Report on Patentability (IPRP) dated Nov. 18, 2010 (and English translation thereof) in parent International Application No. PCT/JP2009/058564.

* cited by examiner

Primary Examiner — Nguyen Tran
(74) Attorney, Agent, or Firm — Holtz, Holtz, Goodman & Chick, PC

(57) ABSTRACT

A switching power supply device has a synchronized rectifying element that turns on and off complementarily with a main oscillation element that is connected in series with an input power supply, and a parasitic diode that is connected to the two ends of the synchronized rectifying element in a direction enabling current supply toward a smoothing circuit. The device has a control circuit that generates a control pulse according to which a time delay is set for turning on the main oscillation element after a certain period of time elapses after the synchronized rectifying element is turned off, and that drives the main oscillation element and the synchronized rectifying element. An auxiliary rectification circuit has a series circuit formed by an auxiliary switch element and an auxiliary capacitor driven by the control circuit (PW2) and which is provided between the two ends of the parasitic diode.

9 Claims, 13 Drawing Sheets

Prior Art

FIG.19
(a)
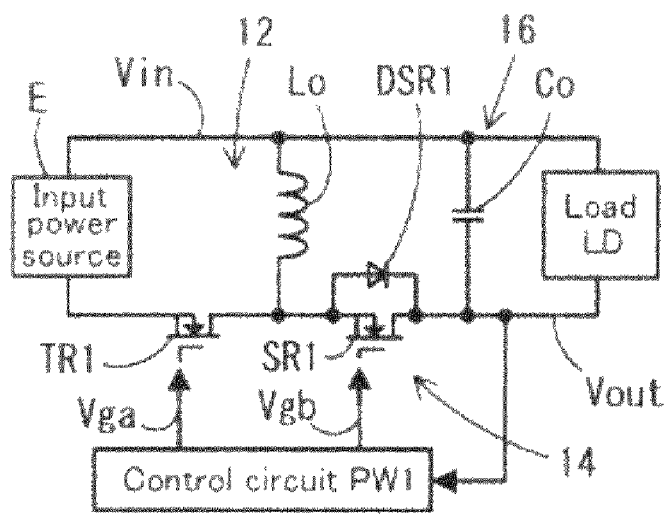
Prior Art
(b)
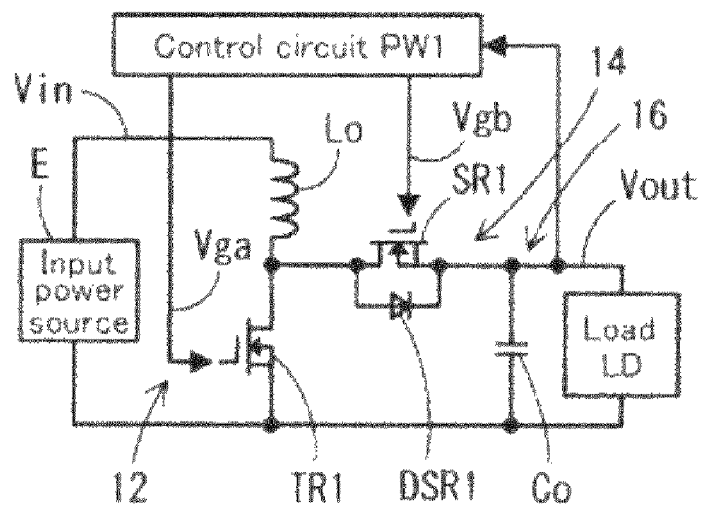
Prior Art

FIG.20
(a)
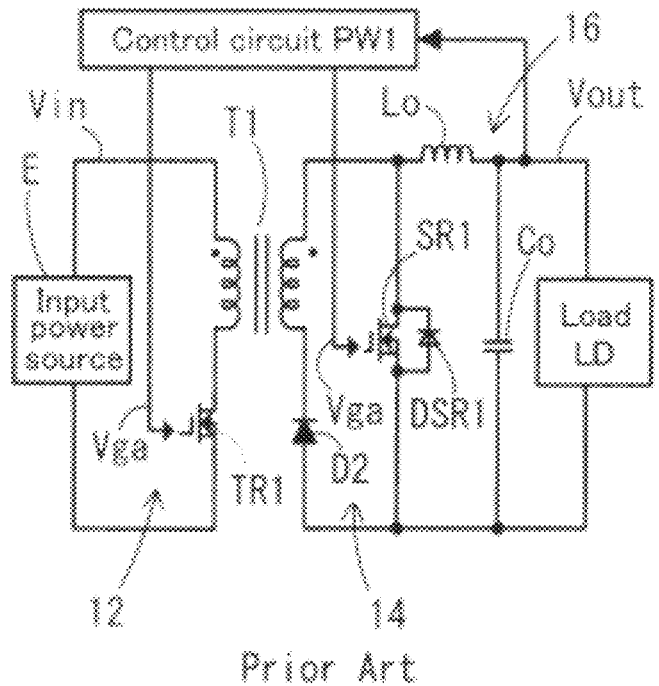
Prior Art
(b)
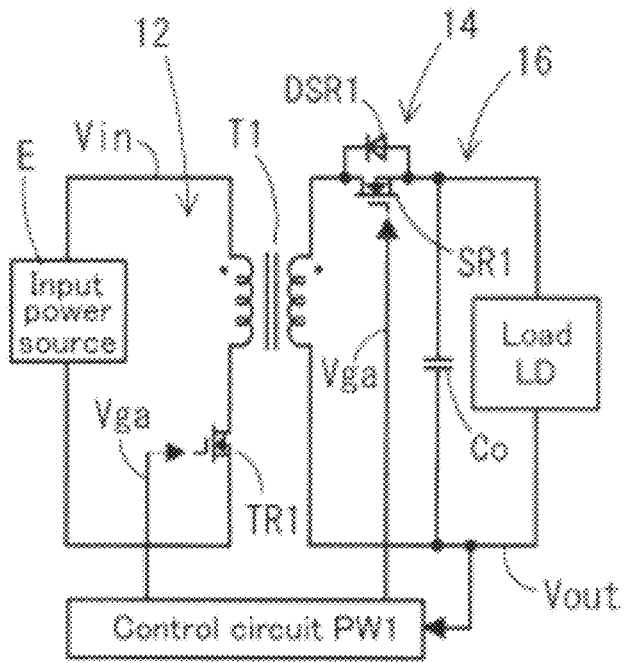
Prior Art

SWITCHING POWER SUPPLY DEVICE

This application is a U.S. National Phase Application under 35 USC 371 of International Application PCT/JP2009/058564 filed May 1, 2009.

TECHNICAL FIELD

This invention relates to a switching power supply device for converting an input voltage to a desired direct current voltage and supply power to electronic equipment, and in particular, to a switching power supply device provided with a synchronized rectifying element which turns on/off complementarily with a main oscillation element.

BACKGROUND ART

Conventionally, a switching power supply device 10 of a step-down chopper system, shown in FIG. 16, for example, is known as a switching power supply device provided with: a main oscillation element which is connected to an input power source in series; and a synchronized rectifying element which turns on/off complementarily with the main oscillation element.

First, a circuit configuration of the switching power supply device 10 will be described. This power supply device is provided with an inverter circuit 12 having a main oscillation element TR1, one terminal of which is connected to a positive side of an input power source E for supplying an input voltage Vin; and a predetermined intermittent voltage is generated at the other terminal of the main oscillation element TR1 by turning on/off the main oscillation element TR1. This main oscillation element TR1 is an N-channel, MOS-type electric field effect transistor (hereinafter, referred to as an "Nch-FET"), one terminal of which is a drain terminal, and is connected to the positive side of the input power source E, the other terminal of which is a source terminal and is an output of an intermittent voltage.

A rectifying circuit 14 having a synchronized rectifying element SR1 for rectifying the above-mentioned intermittent voltage is provided with an output of the inverter circuit 12 and a negative side of the input power source E, and the rectified voltage obtained by rectifying the abovementioned intermittent voltage is output to each end of the synchronized rectifying element SR1. This synchronized rectifying element SR1 is an Nch-FET, for example, a drain terminal is connected to a source terminal of the main oscillation element TR1, and the source terminal is connected to the negative side of the input power source E. In general, inside the Nch-FET, a PN-junction-type parasitic diode DSR1 is formed from the source to the drain. Therefore, the abovementioned rectifying element is substantially comprised of a parallel circuit of the synchronized rectifying element SR1 and the parasitic diode DSR1.

A smoothing circuit 16, which is obtained by connecting an inductor Lo and a capacitor Co in series, is connected to each end of the synchronized rectifying element SR1, and an output voltage Vout, which is obtained when the abovementioned rectified voltage is smoothened, is generated at each end of the capacitor Co. Predetermined power is then supplied to a load LD which is connected to each end of the capacitor Co.

In addition, each of control pulses Vga, Vgb which are generated by a control circuit PW1 and turn on/off complementarily is input to a gate terminal which the main oscillation element TR1 and the synchronized rectifying element SR1 have. The control pulses Vga, Vgb are pulse-width modulated and generated based upon an input voltage Vin and an output voltage Vout. Further, in the operations of the control pulses Vga and Vgb, a delay time Δtd, which causes the main oscillation element TR1 to turn on, is set within a predetermined period of time after the synchronized rectifying element SR1 has turned off.

Next, an operation of the switching power supply device 10 will be described with reference to FIGS. 17 and 18. In a duration I, the control pulse Vga is in a high level state, and a main oscillation element TR1 turns on. On the other hand, the control pulse Vgb is in a low level state, the synchronized rectifying element SR1 turns off. Therefore, as shown in FIG. 18(a), the input power source E supplies a power current to a path running through the main oscillation element TR1, the inductor Lo, the capacitor Co, and the load LD, and at the same time, accumulates excitation energy to the inductor Lo.

In a duration II, the control pulse Vga indicates a low level, and the main oscillation element TR1 turns off. On the other hand, the control pulse Vgb indicates a high level, and the synchronized rectifying element SR1 turns on. Therefore, as shown in FIG. 18(b), due to counter-electromotive power generated in the inductor Lo, a power current flows in the path running through the capacitor Co and the load LD and/or the synchronized rectifying element SR1, and the excitation energy accumulated in the inductor Lo is radiated. At this time, since conduction resistance of the synchronized rectifying element SR1 is sufficiently small, no power current flows in the parasitic diode DSR1.

A duration III is a duration of the delay time Δtd from a time point when the abovementioned synchronized rectifying element SR1 turns off to a time point when the main oscillation element TR1 turns on. This delay time Δtd is set to prevent a surge current from flowing due to the occurrence of a substantial short-circuit at each end of the input power source E if the main oscillation element TR1 and the synchronized rectifying element SR1 turn on simultaneously. In this duration III, the control pulse Vga indicates a low level, and the main oscillation element TR1 turns off. On the other hand, the control pulse Vgb also indicates a low level, and the synchronized rectifying element SR1 also turns off. Therefore, as shown in FIG. 18(c), the power current due to the counter-electromotive power generated in the inductor Lo flows in the path running through the capacitor Co and the load LD and/or the parasitic diode DSR1.

When a duration IV is entered, the control pulse Vga is inverted to a high level, and the main oscillation element TR1 turns on. On the other hand, the control pulse Vgb is maintained at a low level and the synchronized rectifying element SR1 turns off. If the main oscillation element TR1 turns on, a reverse current is applied to each end of the parasitic diode DSR1 in which a forward current has flown so far, and a recovery current can flow in a direction from a cathode terminal to an anode terminal. Therefore, as shown in FIG. 18(d), a current flows from the input power source E to a path running through the main oscillation element TR1 and/or the parasitic diode DSR1. The recovery current will be described later.

As described above, the switching power supply device 10 performs an operation of converting the input voltage Vin to the predetermined output voltage Vout and supplying output power to the load LD, by repeating the operations of the abovementioned duration I to IV.

In addition, as disclosed in patent document 1, there is a switching power supply device comprising a configuration in which: a regenerative snubber circuit obtained by serially connecting a capacitor to a parallel circuit of a diode and a transistor is provided at each end of a commutation element; if a main oscillation element turns on, and at the same time, a commutation element turns off, the energy accumulated in a leakage inductor of a smoothing inductor is absorbed in the capacitor via the diode, and the transistor is turned on after the elapse of a predetermined period of time, thereby regenerating the absorbed energy in a secondary-side commutation circuit. Although a specific mode of the commutation element in this switching power supply device is not mentioned, it is construed that the working and effect set forth in patent document 1 are attained, in the case of employing an Nch-FET having a parasitic diode in addition to a general PN-junction-type diode as well.

PRIOR ART DOCUMENT

Patent Document

Patent document 1: Japanese Patent Application Laid-open No. 2005-27394

DISCUSSION OF THE INVENTION

Problems to be Solved by the Invention

However, the abovementioned switching power supply device 10 has entailed a problem that, in the duration IV, a power loss increases due to the recovery current flowing into the PN-junction-type parasitic diode DSR1.

The PN-junction-type diode is ideally a so called element having a rectification action in a forward direction, characterized in that a forward current is flown by application of a forward bias and no current is flown in a reverse direction even if a reverse bias is applied. However, this element has property that when the orientation of a voltage applied is rapidly inverted, a backward current temporarily flow.

In a diode to which a forward bias has been applied, an electron is supplied from a cathode-side electrode to an internal N-type semiconductor, and a hole is supplied from an anode-side electrode to an internal P-type semiconductor. In addition, due to an effect of an electric field produced by a bias voltage, the electron supplied from the cathode-side electrode moves to an anode side and a hole supplied from the anode-side electrode moves to a cathode side inside of a semiconductor. The movement of the electron and hole is a forward current. In the diode when the forward current is flowing, an N-type semiconductor portion is filled with electrons, and a P-type semiconductor portion is filled with holes.

If the orientation of a voltage is inverted momentarily from a state in which this forward bias has been applied, to a reverse bias, the supply of holes and electrons from the outside of both electrodes is stopped, and the electrons and holes inside of the semiconductor start movement in a direction opposite to that in which they move the inside of the semiconductor at the time of application of each forward bias. That is, a reverse current is produced due to the movement of these carries (electrons and holes) in the opposite direction.

Due to movement of the carriers, many of the holes are attracted to the anode-side electrode and many of the electrons are attracted to the cathode-side electrode, and after a predetermined time has elapsed, a layer called a depletion layer in which a carrier concentration has lowered is formed in the vicinity of a junction portion of the P-type semiconductor and the N-type semiconductor, and a diode is established in a state in which no current is flown.

As just described, when a forward bias is applied to a PN-junction-type diode, and then, a state in which a forward current is flowing is rapidly changed to a state of application of a reverse bias, a duration in which a reverse current is flown by the carriers accumulated in a semiconductor exists for a predetermined period of time. This reverse current designates a recovery current; a time interval for the recovery current to flow designates a recovery time; and a behavior of a series of carriers designates a recovery operation.

As shown in FIG. 18(d), in the duration IV, although a recovery current flows from the input power source E to a path running through the main oscillation element TR1 and/or parasitic diode DSR1, since the one that limits a current value of this recovery current is very small impedance such as conduction resistance of the main oscillation electrode TR1 or wiring resistance, a very large recovery current flows. This recovery current then becomes a large power loss, and is consumed by the main oscillation element TR1 or the parasitic diode DSR1. Therefore, the generation of this recovery current has been a main factor of inhibiting high efficiency of the switching power supply device.

In addition, since the power loss due to this recovery current is predisposed to occur each cycle of switching, the more significant the power loss become, as the higher a switching frequency becomes; and therefore, the switching frequency cannot be set at a high frequency, having thus precluded miniaturization of magnetic parts or smoothing circuit and the like, of the switching power supply device.

Further, conventionally, synchronized rectifying circuits employing Nch-FETs are the known art having an effect of reducing a conduction loss of a rectifying circuit employing a diode. Many of these circuits are used in a switching power supply device of a comparatively low output voltage of 5V or less, for example, whereas almost none of them have been used in a switching power supply device of a comparatively high output voltage.

In the switching power supply device of a high output voltage, there is a need to select an Nch-FET of a high rated voltage between drain and source in comparison with the switching power supply device of a low output voltage. However, in general, since an Nch-FET of a higher rated voltage is remarkably extended in recovery time of a parasitic diode, the above-described problem due to the recovery operation is prone to be more significant. Therefore, in the switching power supply device of an output voltage in particular, even if a synchronized rectifying circuit employing an N-ch-FET is used, the power loss due to the recovery operation increases more significantly than the case that the conduction loss due to Nch-FET is reduced, and a power loss could not be reduced as a whole. In addition, although it is contemplated that there should be a troubleshooting method of connecting fast recovery diodes designed to reduce recovery time in parallel outside of the Nch-FET and masking recovery operation of a parasitic diode, a satisfactory effect could not be obtained even by such fast recovery diodes, and the above-described problem due to the recovery operation could not be solved.

In addition, although the switching power supply device 10 shown in FIG. 16 is of step-down chopper system, there exist switching power supply devices of other circuit systems, such as a non-insulation-type switching power supply device of polarity-reversed step-up/step-down chopper system shown in FIG. 19(a) or step-up chopper system shown in FIG. 19(b), or alternatively, an insulation-type switching power supply device of single-ended forward system shown in FIG. 20(a) or of flyback system shown in FIG. 20(b). However, many circuit systems including these systems have: a main oscillation element TR1 employing an Nch-FET which is serially connected to an input power source E; and a synchronized rectifying element SR1 employing an Nch-FET turning on/off complimentarily with the main oscillation element TR1. These circuit systems also comprise a configuration driven by each of the control pulses Vga, Vgb for which a predetermined delay time Δtd is set. Further, they have entailed the above-described problem due to the recovery operation of the parasitic diode DSR1, like the switching power supply device 10.

On the other hand, in the switching power supply device disclosed in patent document 1, for example, in the case where a fast recovery diode which is a PN-junction-type diode is employed as a commutation element, although an operation of regenerating the energy accumulated in a leakage inductor of a smoothing inductor is performed, an operation of precluding generation of a recovery current of the fast recovery diode is not performed; and therefore, the above-described problem such as lowered efficiency arises. In addition, even in the case where an Nch-FET having a parasitic diode is employed in a commutation element, a recovery current is generated in a parasitic diode in the duration IV shown in FIG. 18(d), and the above-described problem such as lowered efficiency has been arisen, like the switching power supply device 10.

In addition, as a technique of restraining a recovery current of a diode for rectification, there is a case that a method of adding a troubleshooting circuit comprised of a choke coil and a capacitor or the like around the diode has been practiced. However, a troubleshooting circuit including magnetic parts entails problems such as difficulty in compactly arranging the circuit, in addition to the occurrence of a comparatively large power loss, and a further improvement has been demanded for.

This invention has been made in view of the above-described background art, and aims to provide a switching power supply device, which is readily capable of achieving high efficiency or miniaturization, for adding a simple circuit, thereby restraining generation of a recovery current of a diode which is connected in parallel to each end of a synchronized rectifying element, or alternatively, a parasitic diode included in an Nch-FET or the like for synchronized rectification.

Means for Solving the Problems

This invention is directed to a switching power supply device, comprising: an inverter circuit for a main oscillation element, which is serially connected to an input power source, to turn on/off to generate an intermittent voltage; a synchronized rectifying element which turns on/off complementarily with the main oscillation element; a rectifying circuit for rectifying the intermittent voltage; a smoothing circuit, which smoothes the voltage rectified by the rectifying circuit, to supply output power to a load; an additional diode of the parasitic diodes or the like, which is connected to each end of the synchronized rectifying element, and is connected in an orientation allowing a current to be supplied to the smoothing circuit in a duration in which the main oscillation element turns off; and a control circuit, which turns on the main oscillation element with a predetermined delay time, after the synchronized rectifying element has turned off, wherein said device has an auxiliary rectifying circuit made of a serial circuit of an auxiliary switch element and an auxiliary capacitor which are connected to both ends of the additional diode and are driven by the control circuit; and wherein the control circuit causes the auxiliary switch element to turn on in conjunction with turning-off of the synchronized rectifying element simultaneously or within the delay time, and thereafter, causes the main oscillation element to turn on to generate a control pulse causing the auxiliary switch element to turn off before the main oscillation element turns off, and then, drive the auxiliary switch element.

In addition, a switching power supply device is characterized in that: a time constant switching circuit, which switches a time constant of a current path including the auxiliary capacitor in accordance with an orientation of a flowing current, is provided in the auxiliary rectification circuit; and is serially connected to a serial circuit of the auxiliary switch element and the auxiliary capacitor. The time constant switching circuit comprises: a serial circuit of a first resistor and a diode; and a second resistor which is connected in parallel to the serial circuit. Further, a resistance value of the first resistor is relatively smaller than a resistance value of the second resistor.

Furthermore, a switching power supply device is characterized in that an auxiliary diode including a parasitic diode, which is connected in an orientation allowing a current to be supplied to the auxiliary capacitor in a duration in which the main oscillation element turns on, is provided at each end of the auxiliary switch element.

The delay time set for the control pulse is set within a time interval at which a voltage of the capacitor that is connected to each end of the main oscillation element lowers to an input voltage or less of the input power source after the synchronized rectifying element has turned off. The capacitor that is connected to each end of the main oscillation element is a capacitive component existing inside of the main oscillation element or is another capacitor for surge voltage absorption. In addition, a switching power supply device is characterized in that the delay time set for the control pulse is set within a time interval at which the voltage across the main oscillation element lowers to zero volt, preferably at a time interval of lowering to zero volt at the earliest possible opportunity.

Advantageous Effects of the Invention

According to a switching power supply device of this invention, a recovery current generated in a diode which is connected in parallel to a conventional synchronized rectifying element can be restrained by adding an auxiliary rectification circuit of a simple configuration, so that a power loss due to the recovery operation hardly occurs. Therefore, this device can contribute to high efficiency and miniaturization of the switching power supply device.

In addition, the generation of a surge voltage due to a recovery current is also restrained simultaneously, and further, the energy accumulated in a leakage inductance such as a transformer or a smoothing inductor can also be absorbed by an auxiliary rectification circuit, so that: switching noise radiated to the outside of the switching power supply device can be reduced; and a filter circuit or the like for noise troubleshooting can be reduced.

Further, in the auxiliary rectification circuit, a time constant switching circuit, which switches a time constant of a current path including an auxiliary capacitor in accordance with an orientation of a current, is added, so that a current stress applied to a main oscillation element or the like can be alleviated, reliably preventing a recovery operation of a diode which is connected in parallel to a synchronized rectifying element.

Furthermore, drive control of an auxiliary switch element is facilitated by connecting an auxiliary diode in parallel to each end of an auxiliary switch element, so that a configuration of a circuit part related to drive of an auxiliary switch element inside a control circuit can be simplified.

Still furthermore, a delay time from turning-off of a synchronized rectifying element to turning-on of a main oscillation element is the one set within a time interval taken until a voltage across the main oscillation element lowers to zero volt, whereby: a loss of the main oscillation element can be reduced; and the generation of switching noise due to the main oscillation element can be restrained.

MODES FOR CARRYING OUT THE INVENTION

Hereinafter, a switching power supply device 20 of a first embodiment of this invention will be described with reference to FIGS. 1 to 3. Like constituent elements of the above-mentioned switching power supply device 10 are designated by like reference numerals, each of which is explained.

The switching power supply device 20, as shown in FIG. 1, is comprised of: a step-down chopper system similar to the one of the switching power supply device 10; and comprises an inverter circuit 12 having a main oscillation element TR1, one terminal of which is connected to a positive side of an input power source E for supplying an input voltage Vin, allowing a predetermined intermittent voltage to be generated at the other terminal of the main oscillation element TR1 by turning on/off the main oscillation element TR1. The main oscillation element TR1 is an Nch-FET, for example, a drain terminal is connected to the positive side of the input power source E, and a source terminal serves as an output of an intermittent voltage.

A rectifying circuit 14 having a synchronized rectifying element SR1 which rectifies the above-mentioned intermittent voltage is provided between an output of an inverter circuit 12 and a negative side of the input power source E, and a rectified voltage obtained by rectifying the intermittent voltage is output to each end of the synchronized rectifying element SR1. The synchronized rectifying element SR1 is an Nch-FET, for example; a drain terminal is connected to a source terminal of the main oscillation element TR1; and a source terminal is connected to the negative side of the input power source E. In addition, inside of the Nch-FET, a PN-junction-type parasitic diode DSR1 is formed from a source to a drain, and the rectification circuit 14 is substantially comprised of a parallel circuit of a synchronized rectifying element SR1 and a parasitic diode DSR1 which is an additional diode. In addition, a smoothing circuit 16, which is obtained by connecting an inductor Lo and a capacitor Co in series, is connected to each end of the synchronized rectifying element SR1, and an output voltage Vout obtained when the rectified voltage has been smoothened is generated at each end of the capacitor Co.

Further, an auxiliary rectification circuit 22 comprised of a serial circuit of an auxiliary switch element Q1 and an auxiliary capacitor C1 is connected in parallel to each end of the synchronized rectifying element SR1. Here, an active element, such as a transistor which does not have a parasitic diode, is employed as the auxiliary switch element Q1.

Moreover, each of the control pulses Vga, Vgb, Vgc which have been generated by a control circuit PW2 is input to a control terminal for driving the synchronized rectifying element SR1 and the auxiliary switch element Q1. The control pulses Vga, Vgb, Vgc, are pulse-width modulated and generated based upon an input voltage Vin and an output voltage Vout. An operation of the control pulse Vga, Vgb, Vgc will be described in detail in description of operation of the switching power supply device 20 to be furnished later.

As just described, the switching power supply device 20 has a configuration in which: an auxiliary rectification circuit 22 is added to the switching power supply device 10 of the above-described background art; and further, the control circuit PW2 that outputs three control pulses are provided in place of the control circuit PW1 that outputs two control pulses.

Next, an operation of the switching power supply device 20 of the embodiment will be described with reference to FIGS. 2 and 3. First of all, in a duration A, a control pulse Vga is at a high level, and a main oscillation element TR1 turns on. In addition, a control pulse Vgb is basically intended to turn on/off complementarily with the control pulse Vga; and is in a low level state in this duration; and a synchronized rectifying element SR1 turns off. Further, a control pulse Vgc is in a high level state, and an auxiliary switch element Q1 turns on. Therefore, as shown in FIG. 3(a), an input power source E supplies a current to a path running through the main oscillation element TR1, an inductor Lo, a capacitor Co, and a load LD; and excitation energy is accumulated in the inductor Lo. At the same time, this power source supplies a current Ic1 (which flows in a downward direction in FIG. 2) to a path running through the main oscillation element TR1, the auxiliary switch element Q1, and an auxiliary capacitor C1, and then, charges the auxiliary capacitor C1.

In a duration B subsequent to the completion of electric charging of the auxiliary capacitor C1 in the duration A, the control pulses Vga, Vgb, Vgc are maintained in a state of the duration A, as shown in FIG. 2. Therefore, like the duration A, the input power supply E continues an operation of supplying a current to a path running through the main oscillation element TR1, the inductor Lo, the capacitor Co, and the load LD and allowing excitation energy to be accumulated in the inductor Lo (FIG. 3(b)). On the other hand, a current Ic1 in the path of the auxiliary switch element Q1 and/or the auxiliary capacitor C1 becomes substantially zero ampere, since: each end of the auxiliary capacitor C1 reaches a voltage which is substantially equal to the input voltage Vin; and electric charging completes.

In a duration C, as shown in FIG. 2, the control pulses Vga, Vgb are maintained in a state of the duration B, whereas the control pulse Vgc is inverted to a low level, and the auxiliary switch element Q1 turns off. Turning-off of the auxiliary switch element Q1 is set at any timing in a duration which is subsequent to the completion of the operation of electrically charging the auxiliary capacitor C1 described in operations of the durations A and B, the duration preceding turning-off of the main oscillation element TR1 in a duration D to be described later. In so far as this timing is concerned, turning-off is established in a state in which the current Ic1 of the auxiliary switch element Q1 is zero; and therefore, a substantial electrical action never takes place, and the operation of the duration B is continued as is (FIG. 3(c)). The auxiliary switch element Q1 turns off, whereby: the electric charge accumulated in the auxiliary capacitor C1 is retained; and a voltage across the capacitor is retained at a voltage which is substantially equal to the input voltage Vin.

In a duration D, as shown in FIG. 2, the control pulse Vga becomes a low level, allowing the main oscillation element TR1 to turn off; and the control pulse Vgb is inverted to a high level, allowing the synchronized rectifying element SR1 to turn on. In addition, the control pulse Vgc continues to be a low level, and the auxiliary switch element Q1 turns off. Therefore, as shown in FIG. 3(d), due to the counter-electromotive power generated in the inductor Lo, a current flows in a path running through the capacitor Co and the load LD and/or the synchronized rectifying element SR1, and the excitation energy accumulated in the inductor Lo is radiated. At this time, since the conduction resistance of the synchronized rectifying element SR1 is sufficiently small, a forward current, which may cause a recovery current, never flows in the parasitic diode DSR1.

In a duration E, with the control pulse Vga being at a low level, while the main oscillation element TR1 is maintained in its turned-off state, the control pulse Vgb becomes a low level, and the synchronized rectifying element SR1 turns off. On the other hand, the control pulse Vgc is inverted to a high level simultaneously or with a slight delay in conjunction with timing of the control pulse Vgb being inverted to a low level; and the auxiliary switch element Q1 turns on. The slight delay, from a time point when the control pulse Vgb is inverted to a low level to a time point when the control pulse Vgc is inverted to a high level, is provided so as not to reverse timing of the auxiliary switch element Q1 substantially turning on after the synchronized rectifying element SR1 substantially has turned off. This value is determined in consideration of an operation velocity of the synchronized rectifying element SR1 or the auxiliary switch element Q1 and a parasitic inductance or a parasitic capacitance which exists in a wiring pattern, and is adjusted in the range from zero to Ltd. Therefore, as shown in FIG. 3(e), the capacitor C1 charged at a voltage which is substantially equal to the input voltage Vin supplies/discharges a current Ic1 to/from a path running through the auxiliary switch element Q1, the inductor Lo, the capacitor Co, and the load LD. (This current flows in an upward direction in FIG. 2). At this time, the auxiliary capacitor C1 has a capacitance of a predetermined voltage or more; and therefore, even if an electric charge is partly discharged due to the abovementioned electric discharge, a voltage across the capacitor is retained at a predetermined voltage or more. In this manner, the auxiliary capacitor C1 continues a discharging operation, and a forward current, which may cause a recovery current, does not flow in the parasitic diode DSR1.

In addition, an operation of converting an input voltage Vin to a predetermined output voltage Vout, and then, supplying the converted output power to a load, is performed by repeating the abovementioned operations of the durations A to E.

As has been described above, according to the switching power supply device 20, the auxiliary capacitor C1 performs a discharging operation, in the duration E from a time point when the synchronized rectifying element SR1 turns off to a time point when the main oscillation element TR1 turns on; and therefore, a forward current never flow in the parasitic diode DSR1. In addition, in a state in which the forward current does not flow, the main oscillation element TR1 then turns on, thus disabling generation of a recovery current. Consequently, a power loss due to a recovery current never occurs. In addition, the generation of a surge voltage due to a recovery current is also restrained, and the energy accumulated in a leakage inductance such as a smoothing inductor is also absorbed and/or regenerated by means of the auxiliary rectification circuit 22, so that switching noise can be reduced.

Next, a switching power supply device 30 of a second embodiment of this invention will be described with reference to FIGS. 4 to 6. Like constituent elements of the abovementioned switching power supply device 20 are designated by like reference numerals, and a duplicate description thereof is omitted. The switching power supply device 30, as shown in FIG. 4, is configured in such a manner that is substantially similar to that of the switching power supply device 20, but is different therefrom in that an auxiliary rectification circuit 32 is provided in place of the auxiliary rectification circuit 22.

The auxiliary rectification circuit 32 has a configuration in which a time constant switching circuit 34 has been serially inserted into the auxiliary capacitor C1 of the auxiliary rectification circuit 22 described above. The time constant switching circuit 34 is comprised of: a serial circuit of a resistor R1 and a diode D1; and a resistor R2 which is connected to the serial circuit in parallel, and the diode D1 is disposed in an orientation in which a forward current can be flown toward an inductor Lo. Here, the resistor R1 is set at a resistance value which is sufficiently smaller than that of the resistor R2. The resistor R1 may be configured with a short circuit being removed therefrom.

Next, an operation of the switching power supply device 30 will be described with reference to FIGS. 5 and 6. Timing with which voltage levels of control pulses Vga, Vgb, Vgc generated by a control circuit PW2 vary is similar to that of the control pulses Vga, Vgb, Vgc in the switching power supply device 20. Therefore, as shown in FIG. 5, an operational state of the switching power supply device 30 can also be divided into durations A to E similarly. The time constant switching circuit 34, which has been newly added, acts on the durations A, E which are durations in which a current flows in the auxiliary capacitor C1.

In the duration A, as shown in FIG. 6(a), an input power source E supplies a current Ic1 to a path running through a main oscillation element TR1, an auxiliary switch element Q1, the time constant switching circuit 34, and the auxiliary capacitor C1, and then, charges the auxiliary capacitor C1. When the current Ic1 passes through the time constant switching circuit 34, this current is blocked by the diode D1, and never flows into the resistor R1, all of which flows in the resistor R2. That is, a time constant of a current path including this auxiliary capacitor C1 is substantially determined by the resistor R2 and the auxiliary capacitor C1.

Therefore, if the resistance value of the resistor R2 is set at a relatively large value, for example, a peak value of the current Ic1 in the duration A can be lowered, and a current stress of the main oscillation element TR1 can be reduced. If the resistance value of the resistor R2 is set at a large value, time (duration A) is extended until charging of the auxiliary capacitor C1 completes; and however, there is no problem in particular as long as charging of the auxiliary capacitor C1 can be completed before the auxiliary switch element Q1 turns off.

An operation of each of the durations B, C, D is similar to that of the switching power supply device 20, and a duplicate description thereof is omitted.

In the duration E, as shown in FIG. 6(b), the capacitor C1 charged at a voltage which is substantially equal to the input voltage Vin supplies a discharge current to a path running through the time constant switching circuit 34, the auxiliary switch element Q1, the inductor Lo, the capacitor Co, and the load LD. Here, since the resistor R1 is set at a resistance value which is sufficiently smaller than that of the resistor R2, when the current Ic1 passes through the time constant switching circuit 34, almost of the current flows in the resistor R1.

As has been described above, in the switching power supply device 30 of the embodiment, the time constant switching circuit 34, which switches a time constant of a current path including the auxiliary capacitor C1 in accordance with a current orientation, is added, so that: a forward current is prevented from flowing into the parasitic diode DSR1; the occurrence of a recovery current is inhibited; and further, a current stress applied to the main oscillation element TR1 or the like can be reduced.

Next, a switching power supply device 40 of a third embodiment of this invention will be described with reference to FIGS. 7 and 8. Here, like constituent elements of the abovementioned switching power supply device 30 are designated by like reference numerals, and a duplicate description thereof is omitted. The switching power supply device 40, as shown in FIG. 7, is configured in such a manner that is substantially similar to that of the switching power supply device 30, and is different therefrom in that an auxiliary rectification circuit 42 is provided in place of the auxiliary rectification circuit 32.

The auxiliary rectification circuit 42 comprises a serial circuit of an auxiliary switch element Q1, a time constant switching circuit 34, and an auxiliary capacitor C1, and further, an auxiliary diode DQ1 is connected in parallel to each end of the auxiliary switch element Q1 in an orientation in which a current can be flown from the main oscillation element TR1 toward the auxiliary capacitor C1. Here, the auxiliary switch element Q1 is configured employing an Nch-FET, for example, and the auxiliary diode DQ1 is configured employing a parasitic diode formed between a drain and a source of the Nch-FET.

Next, an operation of the switching power supply device 40 will be described with reference to FIG. 8. An operational state of the switching power supply device 40, as shown in FIG. 8, can be divided into durations A, C, D, E. An operational difference from the switching power supply device 30 lies in the duration A. In addition, an operational state equivalent to the period B in the switching power supply device 30 does not exist.

The duration A can be further divided into a duration A1 and a duration A2 on the border of timing of a control pulse Vgc being reverted from a high level to a low level. The duration A1 is an operational state which is identical to the duration A in the aforementioned switching power supply device 30, and as shown in FIG. 6(a), an input power source E supplies a current Ic1 to a path running through a main oscillation element TR1, an auxiliary switch element Q1, a time constant switching circuit 34, and an auxiliary capacitor C1, and then, charges the auxiliary capacitor C1. The duration A1 then terminates in the middle of charging the capacitor C1.

If a control pulse Vgc is inverted from a high level to a low level, and the duration A2 is then entered, the auxiliary switch element Q1 turns off. Alternatively, the auxiliary diode DQ1 that is connected in parallel to the auxiliary switch element Q1 is conductive, and charging of the capacitor C1 is continued.

That is, the operation of the duration A in the switching power supply device 40 of the embodiment is different in comparison with the operation of the duration A in the switching power supply device 30 of the above-described second embodiment in that a path of a charge current of the capacitor C1 can be switched from the auxiliary switch element Q1 to the auxiliary diode DQ1 in the middle of charging, whereas these operations are precisely identical to each other as to an electrical action related to restraining of a recovery current.

However, in the switching power supply device 30 of the second embodiment, since the auxiliary diode DQ1 is not provided, there has been a need to maintain a high level of a control pulse Vgc in a comparatively long period of time, from the duration E to the duration A from the commencement to the completion of charging of the capacitor C1. On the other hand, in the switching power supply device 40, the control pulse Vgc may be maintained at a high level by Δtc which is a very short time exceeding at least the duration E, and further, timing of inverting into a low level also does not need to be precise, so that a configuration of a circuit portion related to driving of the auxiliary switch element Q1 in a control circuit PW2 can be simplified.

The operation of each of the durations C, D, E is similar to that of the switching power supply device 30, and a duplicate description thereof is omitted.

As has been described above, the switching power supply device 40 is the one which has further added improvement to the switching power supply device 30, and the auxiliary diode DQ1 is added to each end of the auxiliary switch element Q1, so that a circuit configuration inside of the control circuit PW2 can be simplified.

Next, a switching power supply device 50 of a fourth embodiment of this invention will be described with reference to FIGS. 9 and 10. Like constituent elements of the aforementioned switching power supply device 40 are designated by like reference numerals, and a duplicate description thereof is omitted. The switching power supply device 50, as shown in FIG. 9, is configured in such a manner that is substantially similar to that of the switching power supply device 40, and is different therefrom in that a control circuit PW3 is provided in place of the control circuit PW2.

The control circuit PW3 is characterized in a method of setting a delay time Δtd, from a time point when a synchronized rectifying element SR1 turns off, to a time point when a main oscillation element TR1 turns on, as to an operation of generating control pulses Vga, Vgb. In addition, as to an operation of generating a control pulse Vgc, timing with which an auxiliary switch element Q1 turns off is different from that of the control circuit PW2. An operation of the control circuit PW3 will be described in detail in description of operation of the switching power supply device 50.

In addition, in the circuit diagram of FIG. 9, for the sake of explaining the working and effect of the control circuit PW3, there is illustrated a capacitor C2 which is a capacitive component existing inside of a semiconductor chip of the main oscillation element TR1 employing an Nch-FET. This capacitor C2 may be a capacitor which is connected in parallel for the purpose of absorbing a surge voltage applied to the main oscillation element TR1.

Next, an operation of the switching power supply device 50 will be described with reference to FIGS. 10 and 11. An operational state of the switching power supply device 50, as shown in FIG. 10, can be divided into durations A, C, D, E. An operational difference from the switching power supply device 40 lies in the duration E. An operation of each of the durations A, C, D is omitted, and a description is given focusing on the operation of the duration E.

In the duration E, as shown in FIG. 11, a capacitor C1 charged at a voltage which is substantially equal to an input voltage Vin supplies a discharge current to a path running through a time constant switching circuit 34, an auxiliary switch element Q1, an inductor Lo, a capacitor Co, and a load LD. This is similar to the operation of the duration E in the switching power supply device 40. In the switching power supply device 50, further, the capacitor C1 supplies a discharge current to a path running through the time constant switching circuit 34, the auxiliary switch element Q1, a capacitor C2 of the main oscillation element TR1, and an input power source E as well. A voltage Vc2 across the capacitor C2 then lowers in accordance with the discharge current and a predetermined time constant which the current path has.

The control circuit PW3 of the embodiment allows a delay time Δtd, from a time point when the synchronized rectifying element SR1 turns off, to a time point when the main oscillation element TR1 turns on, to be set at a time interval taken until a voltage Vc2 lowers up to a predetermined low voltage value (preferably at a time interval taken until the voltage lowers to the input voltage Vin or less, or alternatively, further preferably at a time interval taken until the voltage lowers to zero volt at the earliest possible opportunity). Therefore, after the voltage Vc2 has lowered to a sufficiently low voltage value, both ends of the capacitor C2 are shorted at the main oscillation element TR1, so that a discharge loss can be reduced. In particular, a discharge loss of the capacitor C2 can also be eliminated by setting the delay time ΔTd at a time interval at which the voltage Vc2 lowers up to zero volt.

Although this discharge loss has caused lowered efficiency in the conventional switching power supply devices, since the more significant the discharge loss becomes, as the higher a switching frequency becomes, this problem is solved by employing the abovementioned control circuit PW3.

As has been described above, the switching power supply device 50 is the one that has further added an improvement to the switching power supply device 40; and the control circuit PW3 allows a discharge loss of the capacitor C2 to be remarkably reduced by appropriately setting the delay time Δtd, and can contribute to high efficiency and miniaturization of the switching power supply device.

Next, other embodiments of this invention will be described with reference to FIGS. 12 to 15. Like constituent elements of the abovementioned switching power supply device 50 are designated by like reference numerals, and a duplicate description thereof is omitted. FIG. 12 is a view of a switching power supply device of step-up chopper system, according to a fifth embodiment. FIG. 13 is a view of a switching power supply device of a polarity-inverted step-up/step-down chopper system, according to a sixth embodiment. FIG. 14 is a view of a switching power supply device of single-ended forward system, according to a seventh embodiment. Further, FIG. 15 is a view of a switching power supply device of flyback system, according to an eighth embodiment. Each of the switching power supply devices according to the fifth to eighth embodiments is provided with a control circuit PW3, having a configuration in which an auxiliary rectification circuit 42 has been connected in parallel to a synchronized rectifying element SR1 and a parasitic diode DSR1. Moreover, like the above-mentioned switching power supply device 50, each of the above devices attains the working and/or effect that a recovery current of the parasitic diode DSR1 is restrained, for example.

The present invention is not limitative to the above-described embodiments. The synchronized rectifying element may be another semiconductor switch element which does not have a parasitic diode, and the rectifying circuit may be configured by separately adding a diode element equivalent to the parasitic diode DQ1 of the above-described embodiments.

The control circuit is not limitative to the one that performs an operation of generating a control pulse based upon an output voltage Vout. For example, the operation may be based upon an output current, output power, and a temperature or the like, and can be arbitrarily selected according to the usage or use state of a switching power supply device.

In addition, as to the control circuit, the timing with which turning-off of the synchronized rectifying element and turning-on of the auxiliary switch element are performed in conjunction with each other, may be within the period in which the effect intended by this invention can be attained, or alternatively, the margin of the timing may be substantially flexible to a certain extent. Further, a switch element other than the main oscillation element TR1, the synchronized rectifying element SR1, and the auxiliary switch element Q1 may also be controlled simultaneously, and for example, a switch element for active clamp or a synchronized rectifying element or the like, which turns on/off a main oscillation element in phase, may be controlled altogether. The control pulse may also be frequency-modulated in addition to the one that is pulse-width modulated.

BRIEF DESCRIPTION OF THE DRAWINGS

FIG. 19 It is a set of circuit diagrams (a) and (b) depicting another example of a conventional non-insulation-type switching power supply device.

FIG. 20 It is a set of circuit diagrams (a) and (b) depicting another example of a conventional insulation-type switching power supply device.

Figure 1:
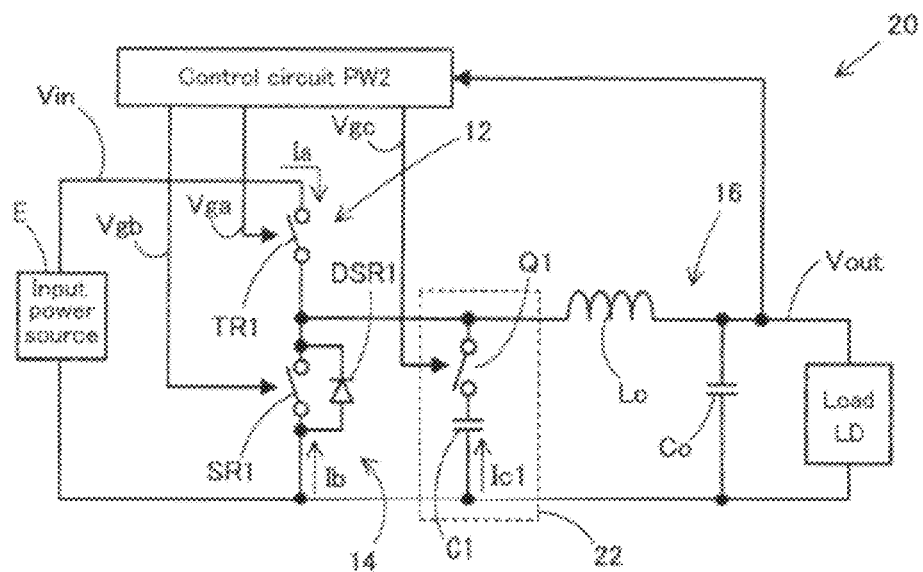
FIG. 1 It is a circuit diagram depicting a first embodiment of a switching power supply device of this invention.
Figure 2:
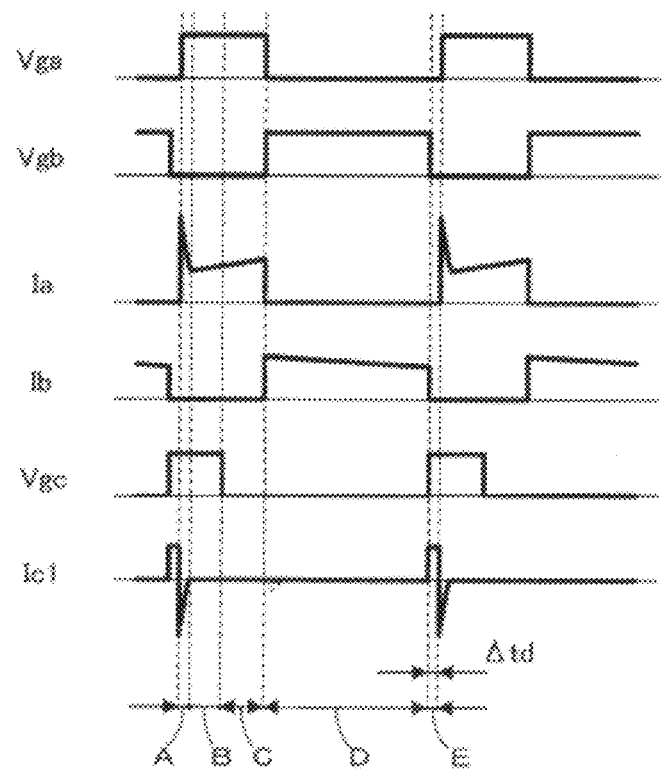
FIG. 2 It is a timing chart showing an operation of the first embodiment.
Figure 3:
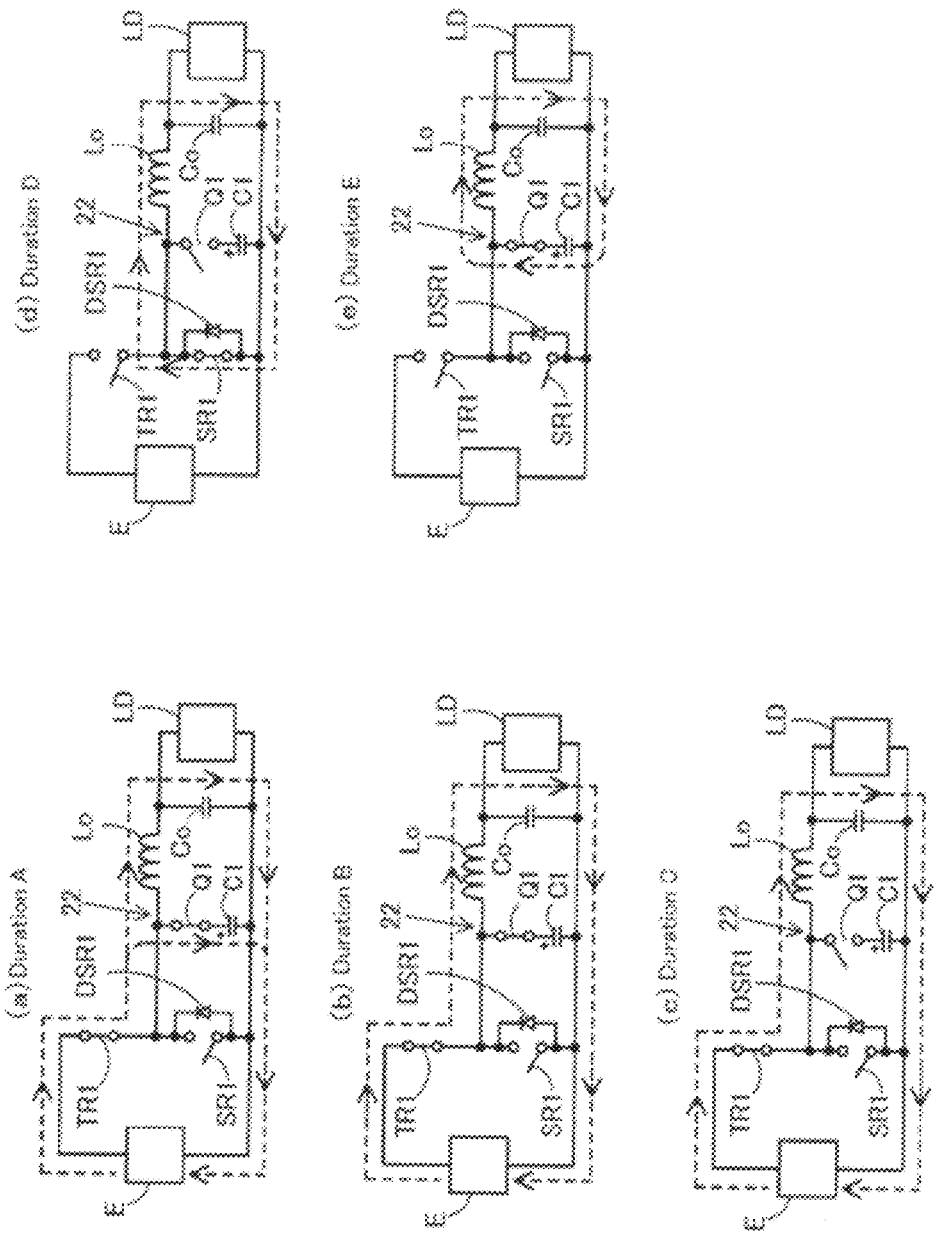
FIG. 3 It is a set of circuit diagrams (a), (b), (c), (d), and (e) explaining operations of durations A, B, C, D, and E in the first embodiment.
Figure 4:
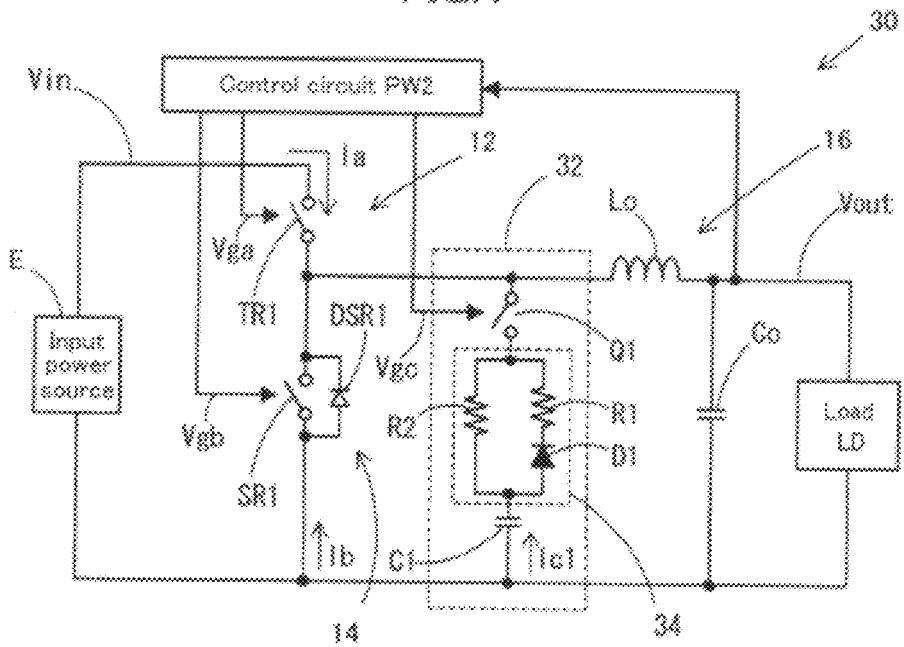
FIG. 4 It is a circuit diagram depicting a second embodiment of a switching power supply device of this invention.
Figure 5:
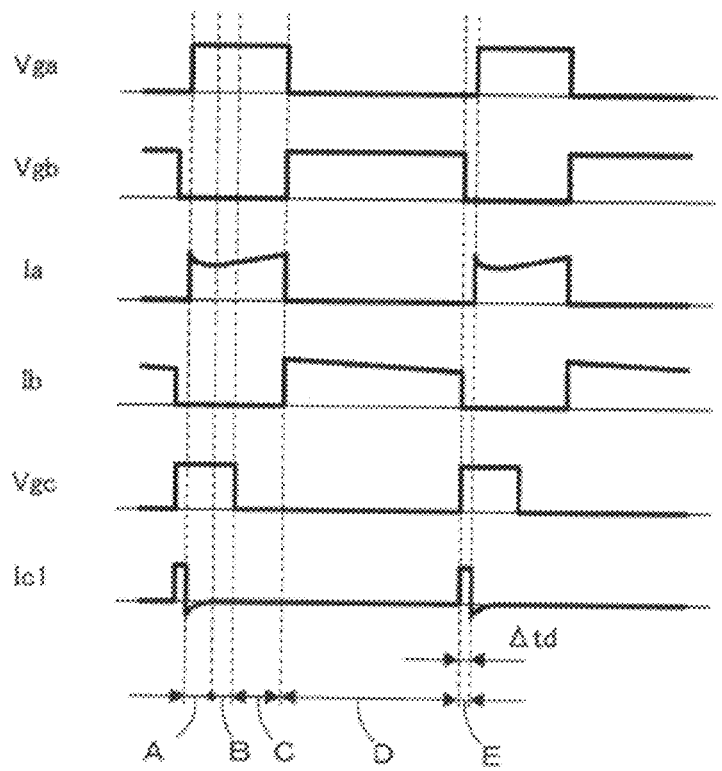
FIG. 5 It is a timing chart showing an operation of the second embodiment.
Figure 6:
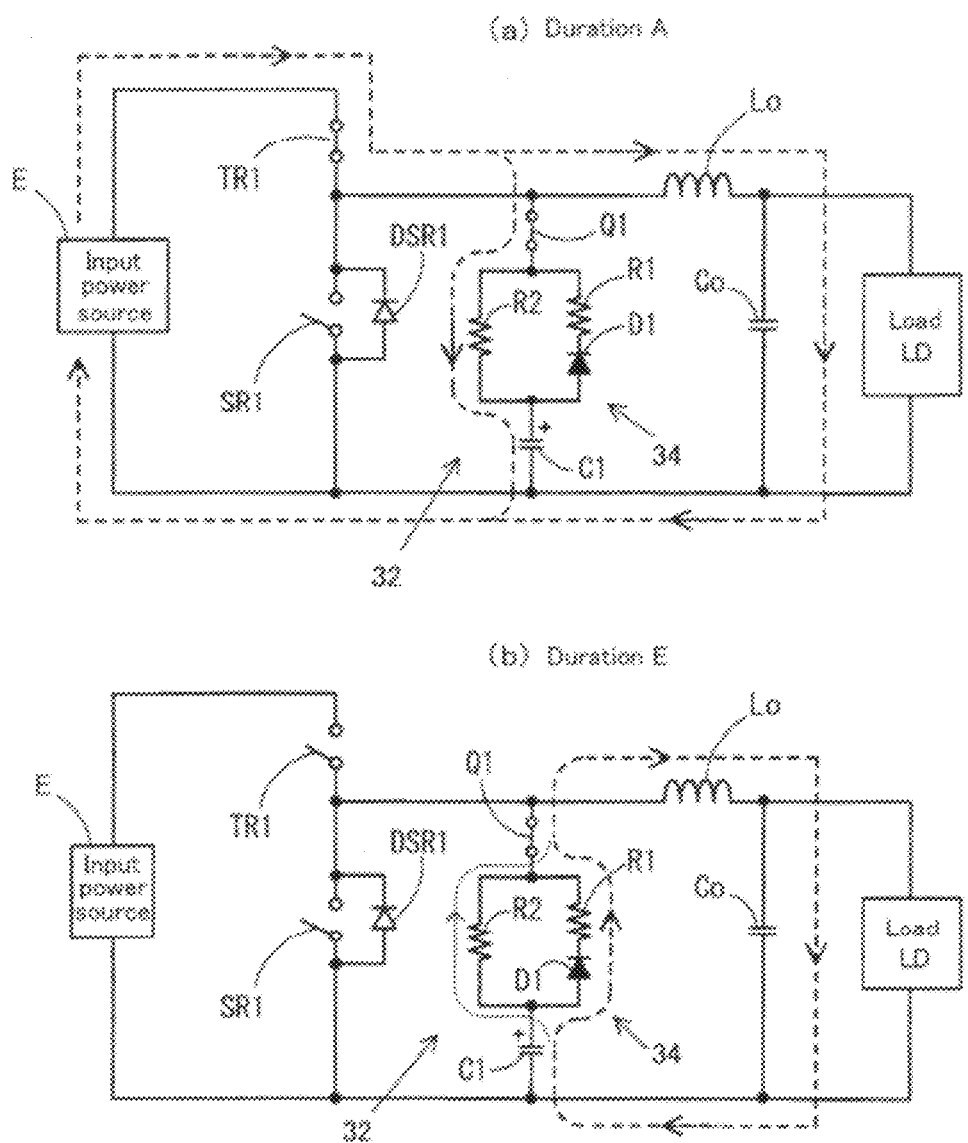
FIG. 6 It is a set of circuit diagrams (a) and (b) explaining operations of durations A and E in the second embodiment.
Figure 7:
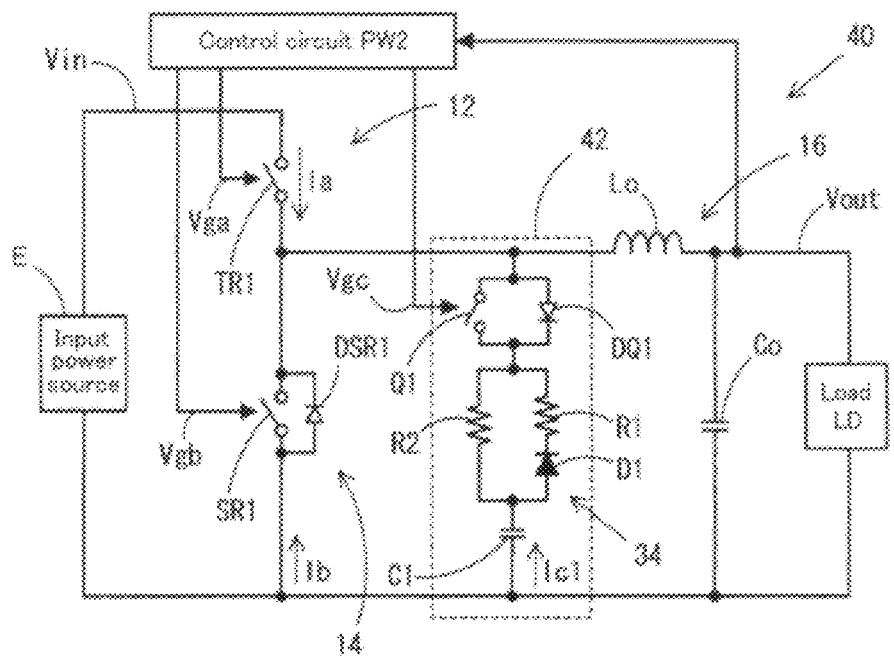
FIG. 7 It is a circuit diagram depicting a third embodiment of a switching power supply device of this invention.
Figure 8:
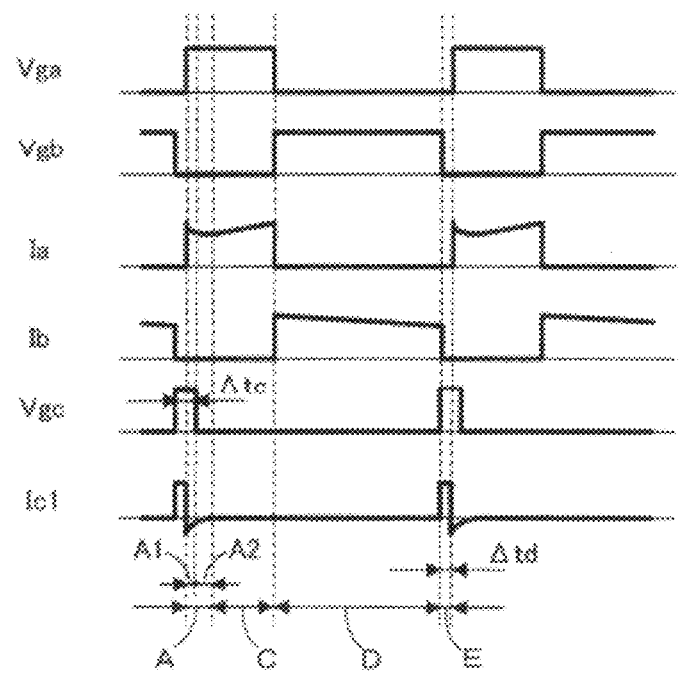
FIG. 8 It is a timing chart showing an operation of the third embodiment.
Figure 9:
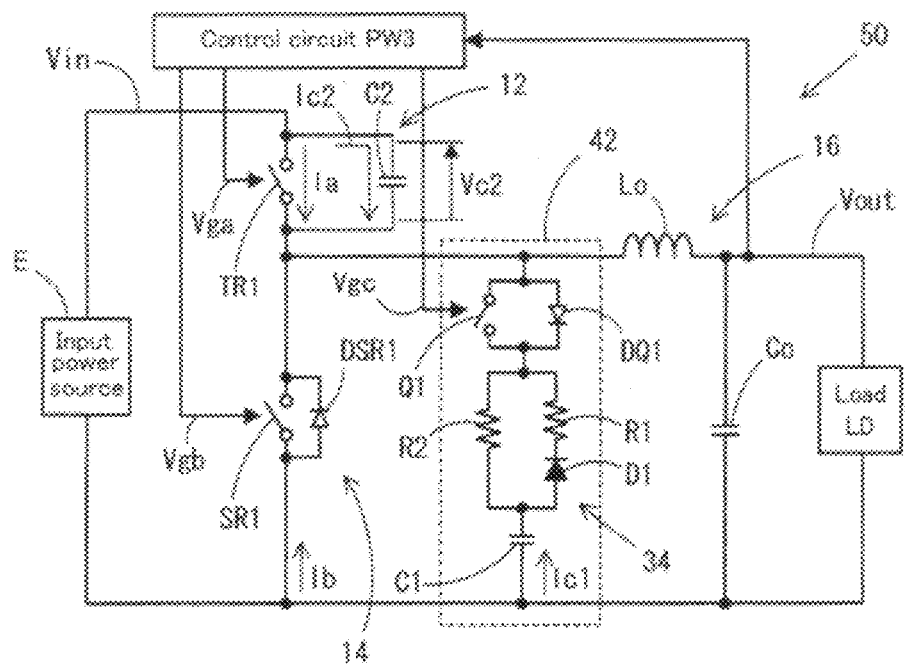
FIG. 9 It is a circuit diagram depicting a fourth embodiment of a switching power supply device of the present invention.
Figure 10:
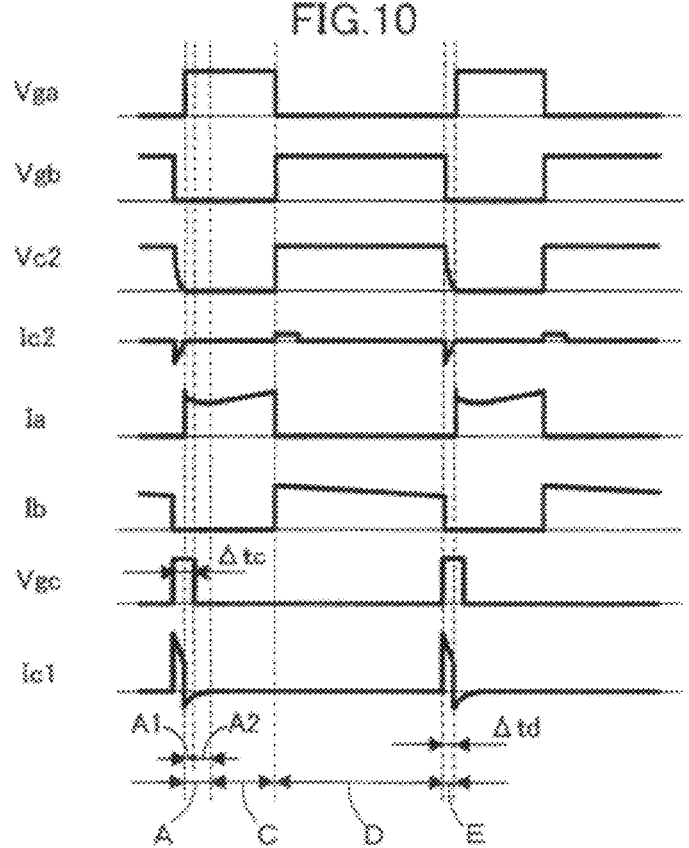
FIG. 10 It is a timing chart showing an operation in the fourth embodiment.
Figure 11:
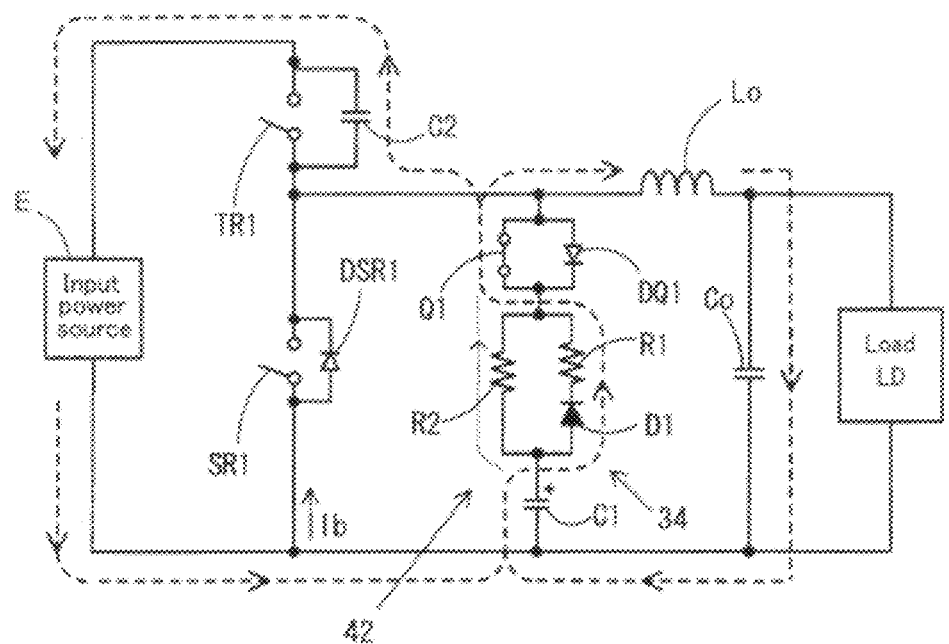
FIG. 11 It is a circuit diagram explaining an operation of a duration E in the fourth embodiment.
Figure 12:
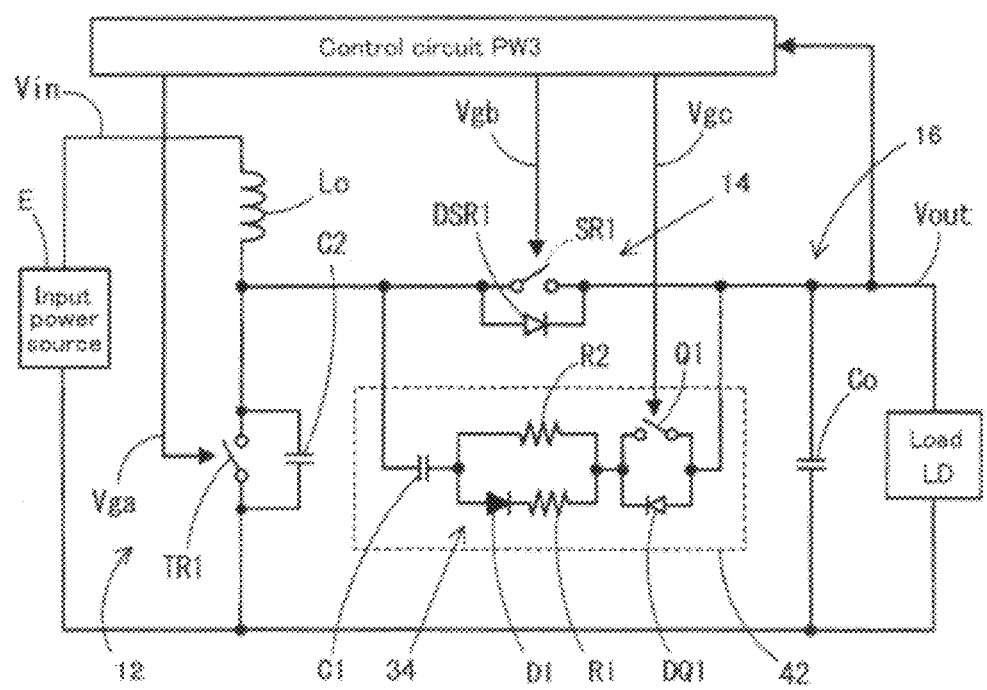
FIG. 12 It is a circuit diagram depicting a fifth embodiment of a switching power supply device of this invention.
Figure 13:
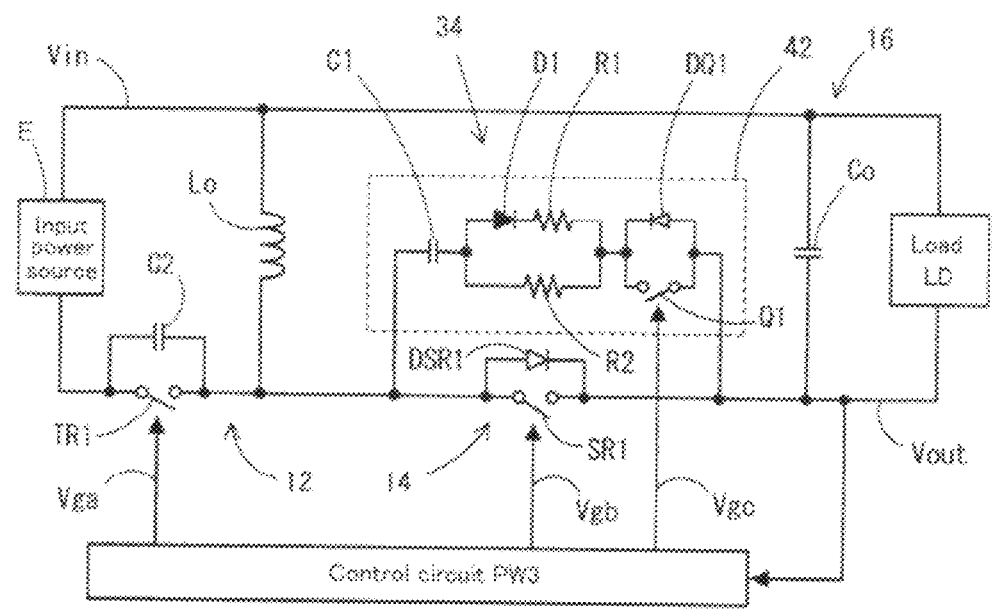
FIG. 13 It is a circuit diagram depicting a sixth embodiment of a switching power supply device of this invention.
Figure 14:
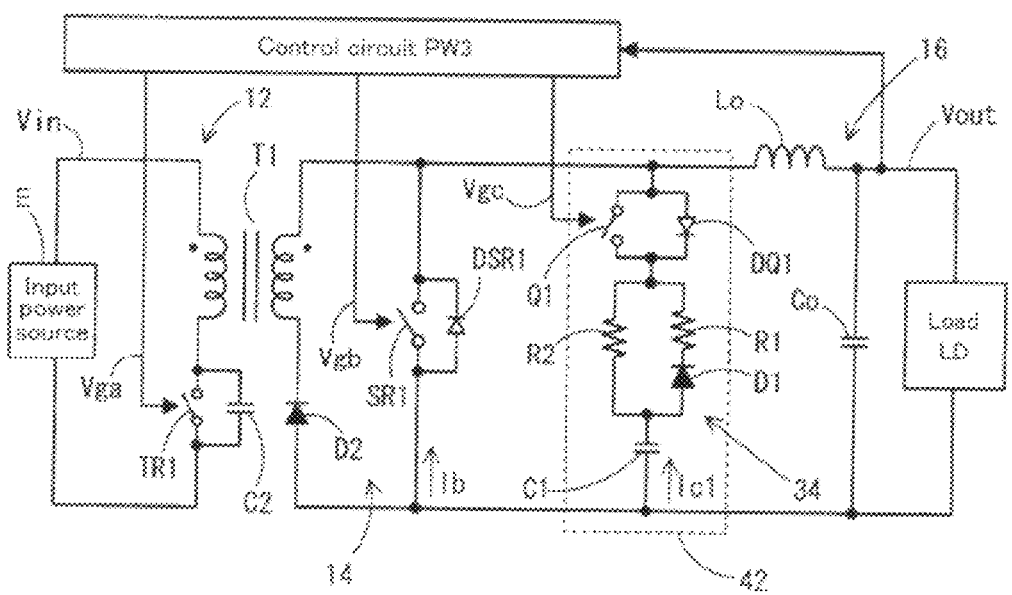
FIG. 14 It is a circuit diagram depicting a seventh embodiment of a switching power supply device of this invention.
Figure 15:
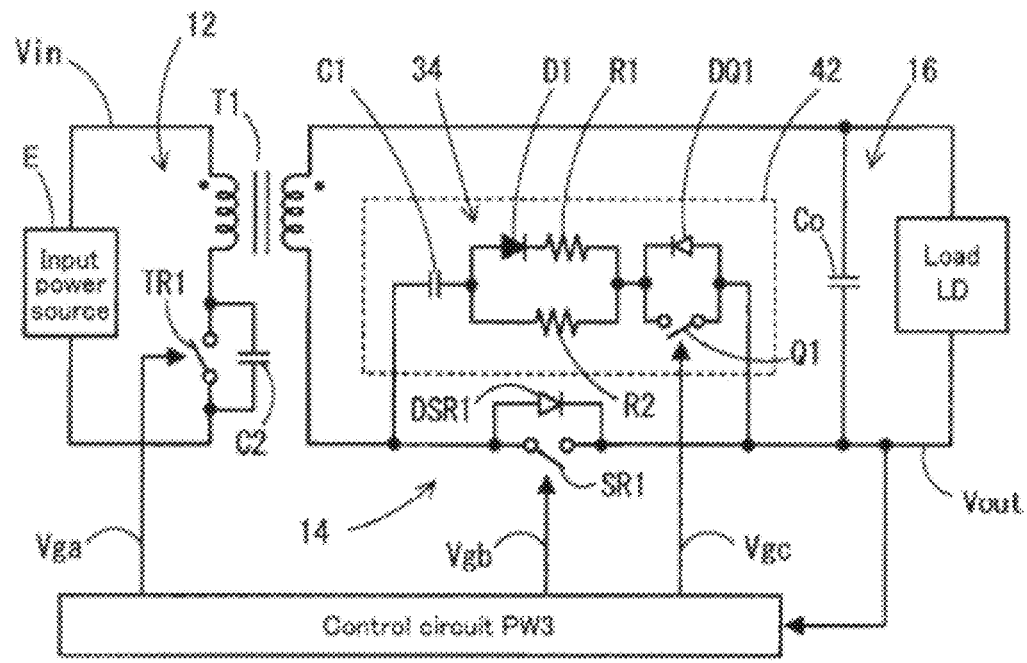
FIG. 15 It is a circuit diagram depicting an eighth embodiment of a switching power supply device of this invention.
Figure 16:
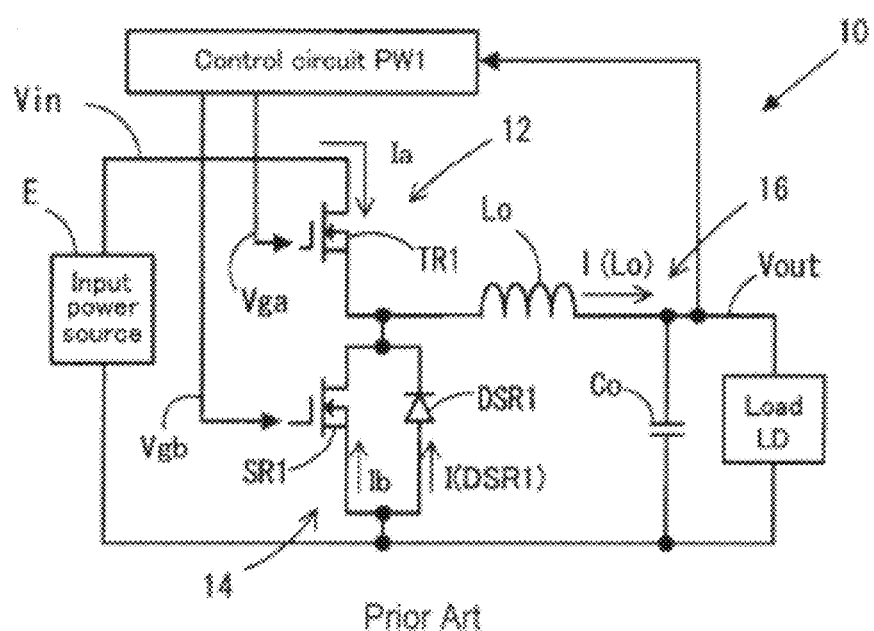
FIG. 16 It is a circuit diagram depicting one example of a conventional switching power supply device.
Figure 17:
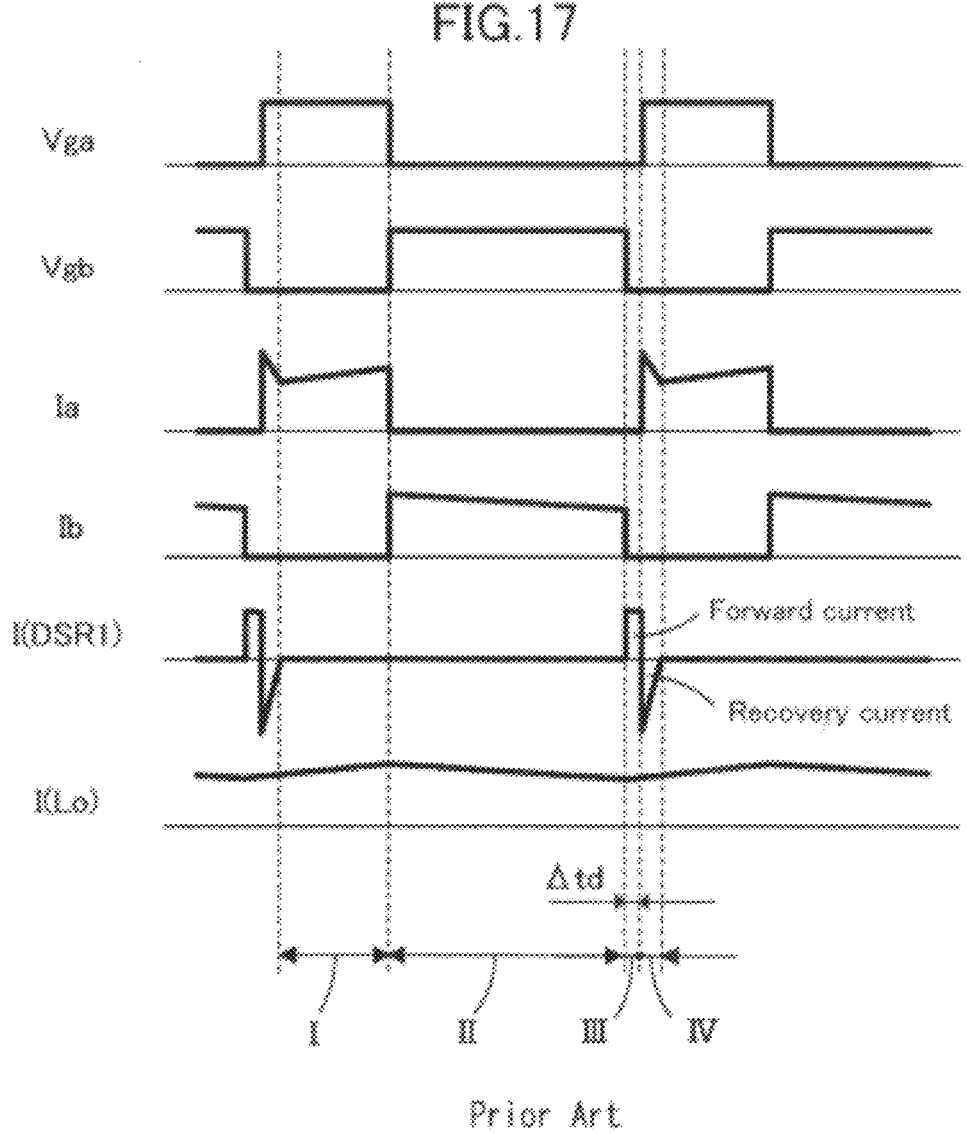
FIG. 17 It is a timing chart showing an operation of the conventional device.
Figure 18:
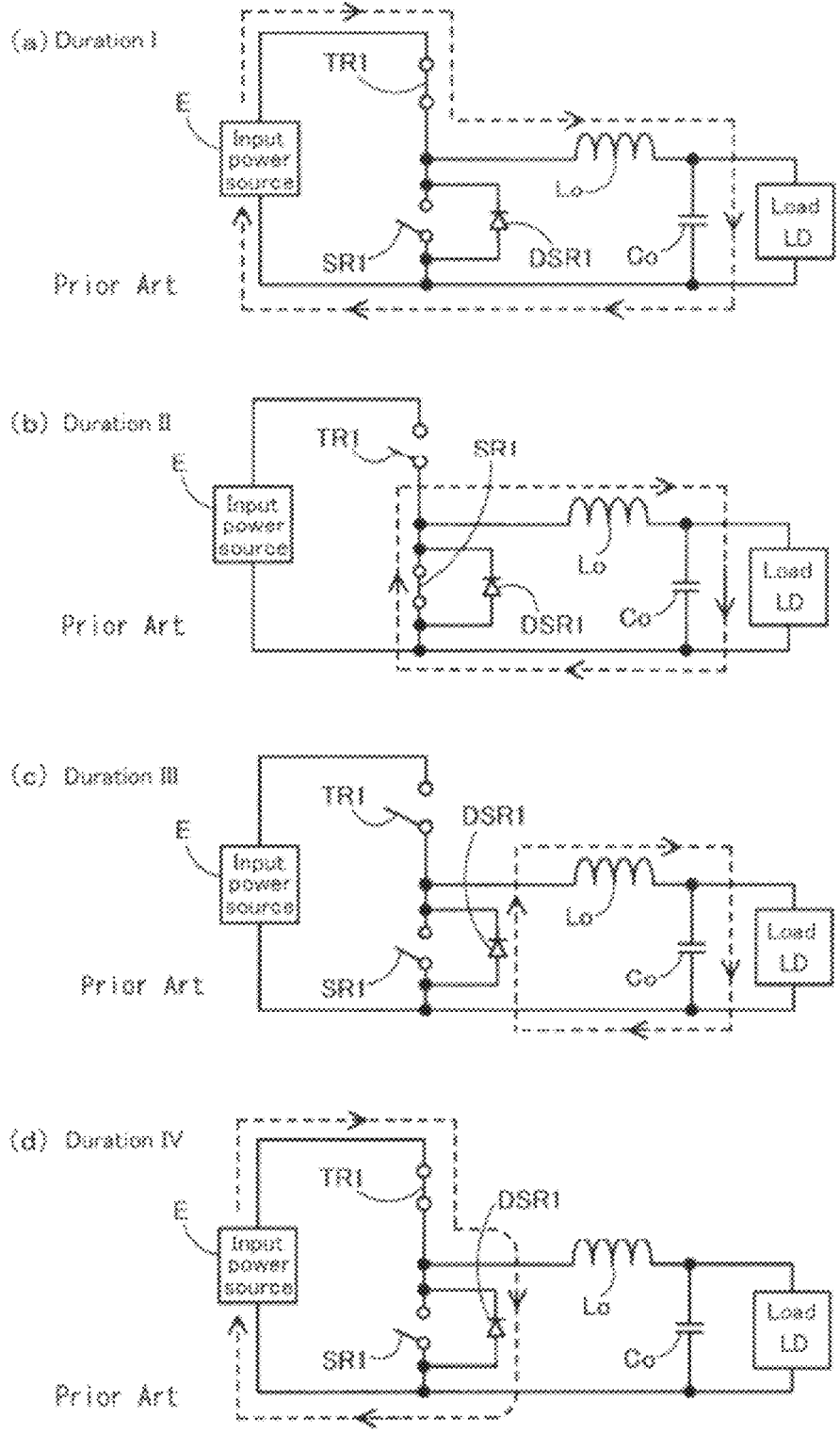
FIG. 18 It is a set of circuit diagrams (a), (b), (c), and (d) explaining operations of durations I, II, III, and IV in the conventional device.

EXPLANATION OF REFERENCE NUMERALS 10, 20, 30, 40, 50 Switching power supply devices
12 Inverter circuit
14 Rectifying circuit
16 Smoothing circuit
22, 32, 42 Auxiliary rectification circuits
34 Time constant switching circuit
C1 Auxiliary capacitor
DQ1 Auxiliary diode
DSR1 Parasitic diode
E Input power source
PW1, PW2, PW3 Control circuits
Q1 Auxiliary switch element
SR1 Synchronized rectifying element
TR1 Main oscillation element

The invention claimed is:
1. A switching power supply device, comprising:
an inverter circuit for a main oscillation element, which is serially connected to an input power source, to turn on/off to generate an intermittent voltage;
a synchronized rectifying element which turns on/off complementarily with the main oscillation element;

a rectifying circuit which rectifies the intermittent voltage;

a smoothing circuit, which smooths the voltage rectified by the rectifying circuit, to supply output power to a load;

an additional diode, which is connected to each end of the synchronized rectifying element, and is connected in an orientation allowing a current to be supplied to the smoothing circuit in a duration in which the main oscillation element turns off;

a control circuit, which turns on the main oscillation element with a predetermined delay time, after the synchronized rectifying element has turned off; and an auxiliary rectification circuit including a serial circuit of an auxiliary switch element and an auxiliary capacitor which are connected in parallel to both ends of the additional diode and which are driven by the control circuit; and wherein the control circuit causes the auxiliary switch element to turn on in conjunction with turning-off of the synchronized rectifying element within the delay time, and thereafter, causes the main oscillation element to turn on to generate a control pulse causing the auxiliary switch element to turn off before the main oscillation element turns off, and then, drive the auxiliary switch element.

2. The switching power supply device set forth in claim 1, wherein the synchronized rectifying element comprises an MOS-type electric field effect transistor, and the additional diode comprises a parasitic diode of the synchronized rectifying element.

3. The switching power supply device set forth in claim 1, wherein a time constant switching circuit, which switches a time constant of a current path including the auxiliary capacitor in accordance with an orientation of a flowing current, is provided in the auxiliary rectification circuit, and is serially connected to the serial circuit of the auxiliary switch element and the auxiliary capacitor.

4. The switching power supply device set forth in claim 3, wherein the time constant switching circuit comprises:
   a further serial circuit of a first resistor and a diode; and
   a second resistor which is connected in parallel to the further serial circuit.

5. The switching power supply device set forth in claim 4, wherein a resistance value of the first resistor is relatively smaller than a resistance value of the second resistor.

6. The switching power supply device set forth in claim 3, wherein an auxiliary diode, which is connected in an orientation allowing a current to be supplied to the auxiliary capacitor in a duration in which the main oscillation element turns on, is provided at each end of the auxiliary switch element.

7. The switching power supply device set forth in claim 1, wherein the delay time set for the control pulse is set within a time interval at which a voltage of the capacitor connected to each end of the main oscillation element lowers to an input voltage or less of the input power source after the synchronized rectifying element has turned off.

8. The switching power supply device set forth in claim 7, wherein the capacitor connected to each end of the main oscillation element is a capacitive component existing inside of the main oscillation element.

9. The switching power supply device set forth in claim 1, wherein the delay time set for the control pulse is set within a time interval at which the voltage across the main oscillation element lowers to zero volts after the synchronized rectifying element has turned off.

* * * * *